H. W. & W. M. BRINK.
AUTOMATIC VALVE FOR PNEUMATIC TIRES.
APPLICATION FILED JAN. 17, 1911.
1,005,149.
Patented Oct. 10, 1911.
2 SHEETS—SHEET 2.
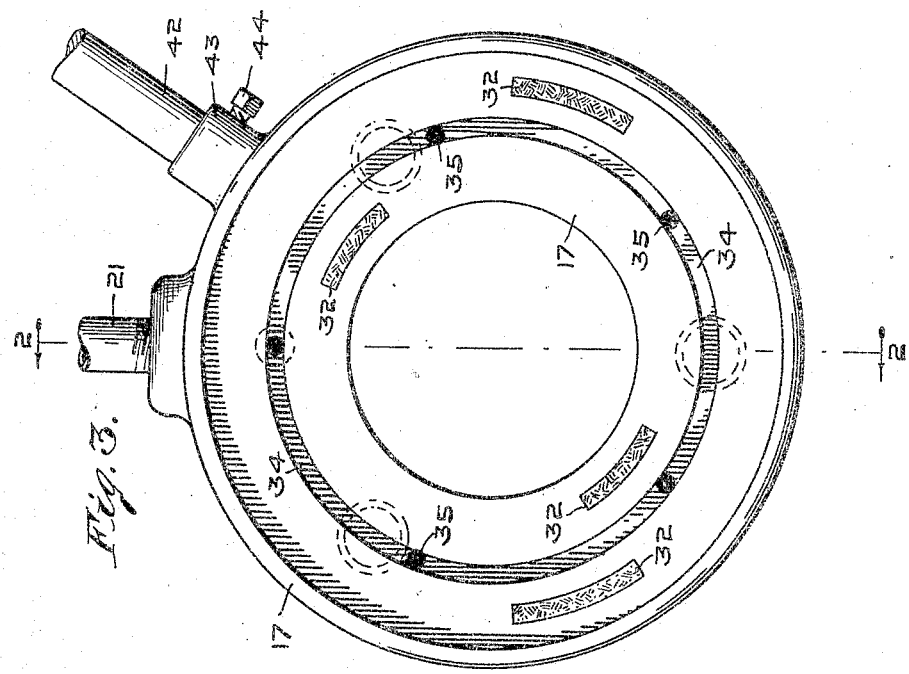
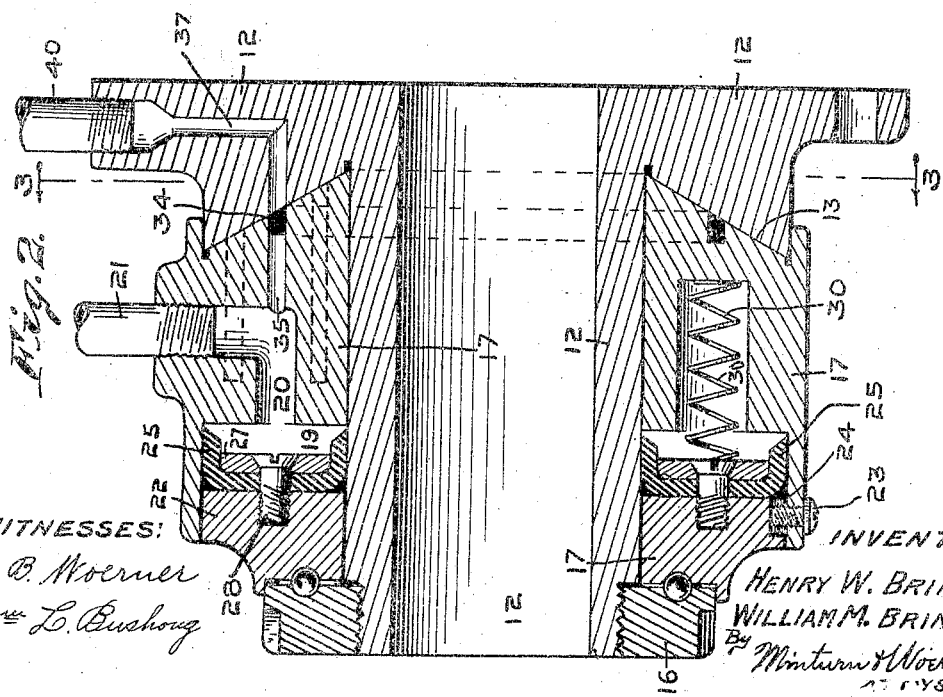
WITNESSES:
L. B. Woerner
W. L. Bushong
INVENTORS
HENRY W. BRINK and
WILLIAM M. BRINK
By Minturn & Woerner
Attys.

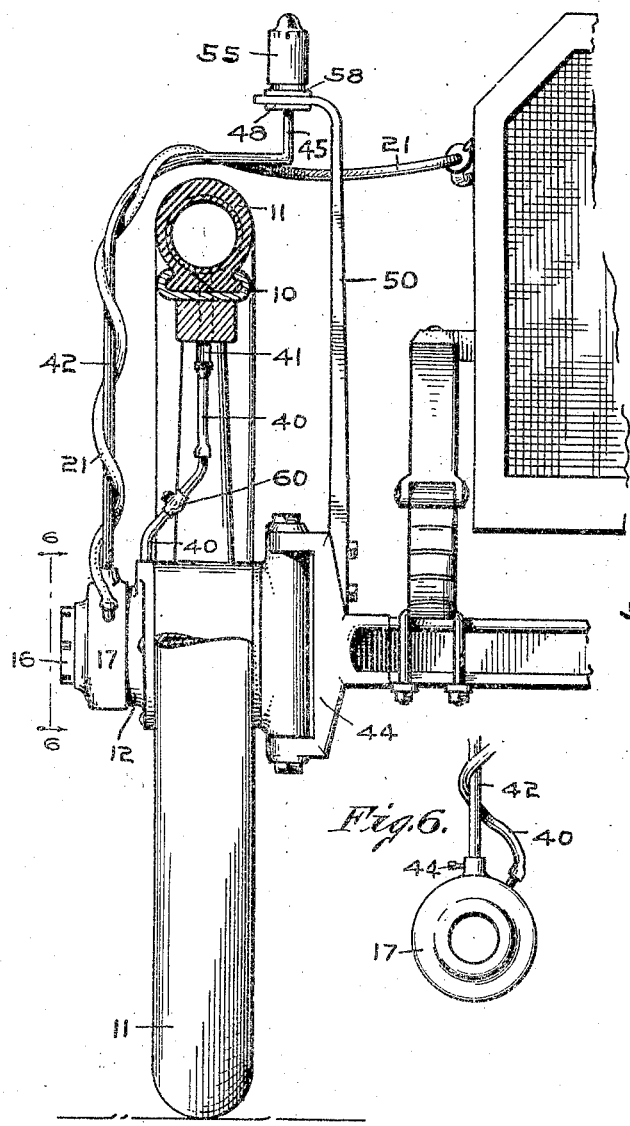
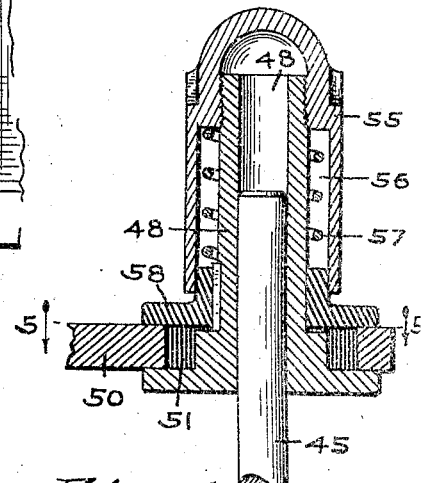
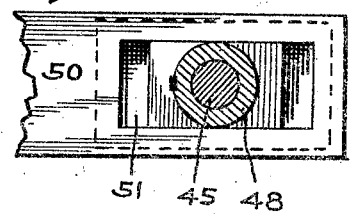
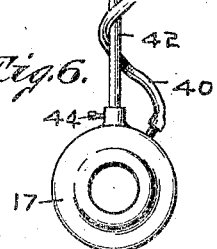

UNITED STATES PATENT OFFICE.

HENRY W. BRINK AND WILLIAM M. BRINK, OF INDIANAPOLIS, INDIANA.

AUTOMATIC VALVE FOR PNEUMATIC TIRES.

1,005,149.   Specification of Letters Patent.   Patented Oct. 10, 1911.

Application filed January 17, 1911.  Serial No. 603,161.

*To all whom it may concern:*

Be it known that we, HENRY W. BRINK and WILLIAM M. BRINK, citizens of the United States, residing at Indianapolis, in the county of Marion and State of Indiana, have invented certain new and useful Improvements in Automatic Valves for Pneumatic Tires, of which the following is a specification.

This invention relates to certain means by which pneumatic tires may be inflated; and the object of the invention is in the provision of means for inflating pneumatic tires with air while the vehicle, on which the tires are employed, is in motion, thereby obviating the necessity of stopping the vehicle and the dismounting of the driver.

We accomplish the above object of the invention by means of the device illustrated in the accompanying drawings, forming a part hereof, in which—

Figure 1 is a fragmentary detail view partly in elevation and partly in section of the forward portion of an automobile showing our invention in operative position. Fig. 2 is a longitudinal central sectional view of one of the wheel hubs through which the air passes to reach the tire, as seen from the line 2—2 in Fig. 3. Fig. 3 is an elevation of the inner end of the outer collar of the hub, as seen from the line 3—3 in Fig. 2. Fig. 4 is an enlarged detail sectional view of the upper end of the compensating bearing. Fig. 5 is a view taken on the line 5—5 in Fig. 4. Fig. 6 is an elevation of the front end of the outer collar of the hub, as seen from the line 6—6 in Fig. 1.

Referring to the drawings, 10 represents the rim of the wheel, and 11 the pneumatic tire of a well known type.

The invention consists, primarily, of a sleeve 12 which is bolted to the outer face of the wheel center and forms the bearing for the wheel in that it receives the axle spindle. The sleeve 12 is reduced in diameter to form the shoulder 13, which may be cut on an angle as shown if desired. The front end of the sleeve 12 is threaded to receive the nut 16 which forms an end bearing for and prevents displacement of the non-rotating or stationary collar 17 which snugly fits the exterior peripheral surface of the reduced portion of the sleeve 12. The rear face of the collar 17 is cut to coincide with the adjacent face of the shoulder 13; in fact, these meeting surfaces being ground to provide a non-leakable air joint when tightly pressed together. The forward end of the collar 17 is recessed to provide an air receiving and distributing chamber 19 which extends around the sleeve 12. The chamber 19 is provided with the inlet opening 20 to which the supply pipe 21 is attached, the latter extending to a suitable compressed air supply which may consist of a high pressure tank conveniently located within the body of the vehicle or an air pump operated by the engine. A ring 22 surrounds the sleeve 12 and incloses the recess in the collar by which the air chamber 19 is formed, and forms a bearing for the forward end of the collar 17. The ring 22 is held against rotation by means of a screw 23 in the collar 17 which screw projects into a channel 24 in the ring. See Fig. 2. The ring 22 and collar 17 have, however, a slight independent movement in a longitudinal direction, and the object of this movement will be hereinafter described. As the air is admitted to the chamber 19 under a high pressure provision against leakage past the ring 22 is made by means of the U-shaped gasket 25, the bent edges of which spread under pressure and thus effectively sealing the joints in the rear. A flat ring 27 and the screws 28 serve to hold the gasket permanently in position.

As has heretofore been mentioned, there is a slight independent longitudinal movement between the ring 22 and the collar 17. This is necessary to permit the formation of tight joints at both ends of the collar 17 during the time the air pressure is on and the tires are being inflated, and to permit the parts to relax to reduce unnecessary friction when the air pressure is removed. When the air enters the chamber 19 the ring 22 will move, if it moves at all, toward the nut 16 so as to form a bearing for steadying the forward end of the collar 17, while the collar will be moved tightly against the adjacent face of the shoulder 13, the abutting surfaces forming a metallic air tight joint between the two parts. To prevent the vibration from rattling the collar 17 after the air pressure is removed we provide the springs 30, located at convenient points around the collar, which exert a slight pressure against the said collar. The meeting surfaces of the collar 17 and the shoulder 13 are kept lubricated by means of the depressions or cups 32 cut into the face of the collar, as clearly shown in Fig. 3 of the drawings, which depressions are filled with suitable lubricant.

The face of the collar 17 adjacent to the shoulder 13 is provided with an annularly extending air conveying groove or channel 34 which communicates with the air chamber 19 at various points by means of a plurality of perforations 35 so that a column of air extends uninterruptedly around the sleeve 12. The sleeve 12, near its rear end, is provided with an air outlet passageway 37 which registers at one end with the annular groove 34 in the collar 17. By this construction the air outlet 37 and the groove 34 are in constant communication while the collar is stationary and the sleeve rotates with the wheel. A pipe 40 communicates with the air outlet 37 and extends to and connects with the valve-stem 41 of the tire, of a well known type.

As heretofore mentioned, the collar 17 is stationary so as to enable a connection to be maintained with the air supply, through the pipe 21. A portion of the air inlet pipe 21 and the outlet pipe 40 is formed of flexible material to permit them to be readily disconnected when for cause it is desired to entirely remove the tire 11 from the rim of the wheel. In view of the partial flexibility of the air inlet pipe 21 it can not be used as an anchorage for the collar 17 to keep the latter from rotating, so that an additional means for this purpose is necessary and to secure that end we provide the stay-rod 42 which engages a socket formed in the boss 43 on the collar 17, and to prevent accidental displacement of the rod 42 from the socket the set screw 44 is provided. The rod 42 extends upwardly and over the wheel to a point, in case it is the front wheel, perpendicularly over the knuckle joint 44 in the axle, at which point the rod 42 is bent upwardly to form the staff 45 for a compensating bearing made necessary so as not to interfere with the movement of the wheel. The staff 45 projects into a vertically disposed sleeve 48 which is supported in the standard 50 secured to the axle, which construction permits of both longitudinal and rotatorial movements between the staff 45 and said sleeve, thereby giving flexibility and ease of movement among the associated parts. The upper end of the standard 50 is bent to lie in a horizontal plane and this horizontal portion is provided with an elongated slot 51 through which the vertically disposed sleeve 48 projects; the sleeve being less in diameter than the length of the slot allows a slight lateral movement in addition to the movements above mentioned. These movements are necessary when it is considered that the standard 50 is rigid while the rod 42 which is attached to the hub is susceptible to the same vibration as the wheel. The upper end of the sleeve 48 is provided with the threaded cap 55 which extends downward around a portion of the sleeve, and the cap is recessed to provide an intervening space 56 for the spring 57 which presses upward against the cap 55 and draws the sleeve 48 tightly against the lower side of the horizontal portion of the standard 50, and the lower end of the spring 57 bears upon the plate 58 which bears upon the upper face of the horizontal portion of the standard 50. By means of this construction the spring 57 firmly clamps the horizontal portion of the standard 50 between the sleeve 48 and the plate 58 and prevents the parts from rattling.

The operation of the invention is as follows: When it is desired to inflate the tires the air is conveyed through the pipe 21 to the annular air chamber 19 in the collar 17. The air passes from the chamber 19 through the several perforations 35 to the annular air distributing groove 34 which groove is in constant communication with the air outlet 37 through which the air passes into the outlet tube 40 which connects with the valve-stem 41 of the tire. The tires of an automobile are inflated until they withstand a resistance of about seventy-five pounds to the square inch, and to prevent overcharging of the tires we insert in the outlet pipe 40 a relief valve 60 which will open and release the air when the pressure within the tire has reached seventy-five pounds. The valve 60 also acts as a signal to notify the operator to shut off the supply and prevent dissipation of the air.

Having thus fully described our said invention, what we desire to secure by Letters Patent, is—

1. The combination with a vehicle wheel provided with a pneumatic tire, of a pneumatic tire inflating device comprising a wheel hub, said hub being provided with an air outlet passageway having its mouth located in the face of the shoulder on said hub, a shoulder formed on said hub, a collar surrounding said hub and abutting the shoulder, said collar having an annularly extending air receiving groove in the end adjacent to the shoulder, said groove registering with the air outlet passageway in the hub, an air supply source communicating with said groove, a pipe connecting the air outlet passageway in the hub with the tire, and means to hold said collar stationary.

2. The combination with a vehicle wheel provided with a pneumatic tire, of a pneumatic tire inflating device comprising a wheel hub, said hub being provided with an air outlet passageway having its mouth located in the face of the shoulder on the hub, a shoulder formed on said hub, a collar surrounding said hub and abutting the shoulder, said collar having an annularly extending air receiving groove in the end adjacent to the shoulder, said groove registering with the air outlet passageway in the hub and a recess formed in the forward end of the collar to provide an air distributing chamber, said collar being further provided with an air passageway connecting the air chamber and groove together, a ring to close the recess and support the forward end of said collar, an air supply source communicating with the air chamber in the collar, a pipe connecting the air outlet in the hub and tire together, and means to hold said collar stationary.

3. The combination with a vehicle wheel provided with a pneumatic tire, of a pneumatic inflating device comprising a wheel hub, said hub being provided with an air outlet passageway having its mouth located in the face of the shoulder on the hub, a shoulder formed on said hub, a collar surrounding said hub and abutting the shoulder, said collar having an annularly extending air receiving groove in the end adjacent to the shoulder, said groove registering with the air outlet passageway in the hub and a recess formed in the forward end of the collar to provide an air distributing chamber, said collar being further provided with an air passageway connecting the air chamber and groove together, a ring to close the recess and support the forward end of said collar, means permitting independent longitudinal movement between the ring and collar, an air supply source communicating with the air chamber in the collar, a pipe connecting the air outlet in the hub and chamber together, and means to hold said collar stationary.

In witness whereof we have hereunto set our hands and seals at Indianapolis, Indiana, this, 2nd day of November, A. D. one thousand nine hundred and ten.

HENRY W. BRINK. [L. S.]
WILLIAM M. BRINK. [L. S.]

Witnesses:
L. B. WOERNER,
F. W. WOERNER.